(12) United States Patent
Danilov et al.

(10) Patent No.: US 11,599,545 B2
(45) Date of Patent: Mar. 7, 2023

(54) STREAM RETENTION IN A DATA STORAGE SYSTEM

(71) Applicant: EMC IP Holding Company LLC, Hopkinton, MA (US)

(72) Inventors: Mikhail Danilov, Saint Petersburg (RU); Igor Medvedev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 502 days.

(21) Appl. No.: 16/795,104

(22) Filed: Feb. 19, 2020

(65) Prior Publication Data

US 2021/0256029 A1     Aug. 19, 2021

(51) Int. Cl.
*G06F 16/00* (2019.01)
*G06F 16/2455* (2019.01)
*G06F 16/23* (2019.01)
*G06F 16/17* (2019.01)
*G06F 16/25* (2019.01)
*G06F 16/22* (2019.01)

(52) U.S. Cl.
CPC .... *G06F 16/24568* (2019.01); *G06F 16/1734* (2019.01); *G06F 16/2228* (2019.01); *G06F 16/2322* (2019.01); *G06F 16/254* (2019.01)

(58) Field of Classification Search
CPC .......... G06F 16/24568; G06F 16/2228; G06F 16/2322; G06F 16/1734; G06F 16/254
USPC ........................................................ 707/769
See application file for complete search history.

(56) References Cited

FOREIGN PATENT DOCUMENTS

WO     WO2017118474 A1 *  7/2017 ............. G06F 17/30

* cited by examiner

*Primary Examiner* — Alexandria Y Bromell
(74) *Attorney, Agent, or Firm* — Amin, Turocy & Watson, LLP (57) ABSTRACT

Stream retention in a data storage system is described herein. A method as described herein can include receiving, by a device operatively coupled to a processor, a hold for a portion of a data stream, wherein the data stream comprises respective events indexed by time, and wherein the portion of the data stream is bounded by a first event of the data stream that is associated with a first time and a second event of the data stream that is associated with a second time; generating, by the device, a synthetic stream comprising the portion of the data stream; and preventing, by the device, events of the data stream that are included in the synthetic stream from alteration.

20 Claims, 11 Drawing Sheets

STREAM RETENTION IN A DATA STORAGE SYSTEM

TECHNICAL FIELD

The subject application is related to data storage, and more particularly, to techniques for managing data retention in a data storage system.

BACKGROUND

As advancements in computing technology have increased the amount and scope of data that can be processed by a computing system, data storage systems have similarly seen significant advances to keep pace with the technical landscape. For instance, in addition to traditional storage systems that work on the basis of blocks, files, objects, and/or other similar data structures, stream-based data storage systems have been developed that implement data sequences called streams as a mechanism to store and/or serve continuous and potentially unbounded data.

Whereas a data stream as managed by a data storage system can be potentially unbounded, storage resources are normally limited. As a result, a stream-based data storage system can facilitate data expiration, data truncation, and/or other means to purge recorded data after a given length of time to allocate storage resources for new data.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a hold processing component that receives a command to implement a hold on a portion of a data stream, where the data stream includes respective events indexed by time and the portion of the data stream is bounded by a first event of the data stream that is associated with a first time and a second event of the data stream that is associated with a second time. The executable components can further include a stream generation component that constructs a synthetic stream from the portion of the data stream. The executable components can also include a data retention component that prevents alteration of events of the data stream that are included in the synthetic stream.

In another aspect, a method is described herein. The method can include receiving, by a device operatively coupled to a processor, a hold for a portion of a data stream. The data stream can include respective events indexed by time, and the portion of the data stream can be bounded by a first event of the data stream that is associated with a first time and a second event of the data stream that is associated with a second time. The method can further include generating, by the device, a synthetic stream comprising the portion of the data stream, and preventing, by the device, events of the data stream that are included in the synthetic stream from alteration.

In an additional aspect, a machine-readable medium including executable instructions is described herein. The instructions, when executed by a processor of a data storage system, can facilitate performance of operations including initiating a hold for a portion of a data stream, where the data stream comprises respective events indexed by time, and where the portion of the data stream is bounded by a first event of the data stream that is associated with a first time and a second event of the data stream that is associated with a second time; adding the portion of the data stream to a synthetic data stream; and preventing alteration of events of the data stream that are included in the synthetic stream.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Unlike conventional data storage systems that work with structures such as blocks, files, and objects, stream storage systems provide a new storage abstraction, referred to as a stream, for continuous and potentially unbounded data. As used herein, the term "stream" refers to a durable, elastic, append-only, unbounded sequence of data. Stated another way, a stream storage system implements streams as a first class primitive for storing and/or serving continuous and unbounded data.

In addition, data associated with a stream can be grouped within the stream into constructs referred to as events. By way of specific, non-limiting example, a blockchain ledger can be stored as a stream, where respective events in the stream correspond to individual contracts. As another example, data collected over time from sensors and/or other devices can be stored and/or maintained as a stream. In general, however, a stream can be utilized for the storage of any suitable unbounded data sequences.

In an aspect, a stream can be identified with a name and/or other suitable identifier. A stream can also be divided into one or more segments, shards, or other units that can contain data corresponding to the stream over a defined time interval. In addition, older stream data can be aggregated into chunks which can be written to other data storage systems, such as object storage systems or file storage systems.

As described above, while a stream is potentially unbounded, storage resources utilized for a stream are typically limited, e.g., by disk capacity, network bandwidth, and/or other factors. To accommodate limited storage resources, a stream storage system can provide mechanisms such as automatic data expiration, explicit truncate commands, and/or other mechanisms to remove data from a stream. A stream can be structured similarly to a queue such that events are added to a tail (front) of a stream and deleted from a head (back) of the stream.

In an aspect, a stream storage system can be configured to hold events associated with a stream, e.g., by preventing events from a specified range of a stream from being deleted. A hold can be initiated according to multiple use cases. By way of example, a system administrator, engineer, or other similar user can implement a hold on respective events of a stream for various purposes, such as to analyze a data anomaly in the stream. As another example, data in a stream that is the subject of litigation or other similar proceedings can be prohibited, e.g., by law or contract, from deletion or alteration while the proceedings are ongoing. Such a hold can be referred to as a litigation hold, legal hold, retention hold, and/or by other terms. The ability to hold data for legal and/or contractual purposes is particularly desirable in industries such as law, medicine, finance, and/or other industries.

Figure 1:
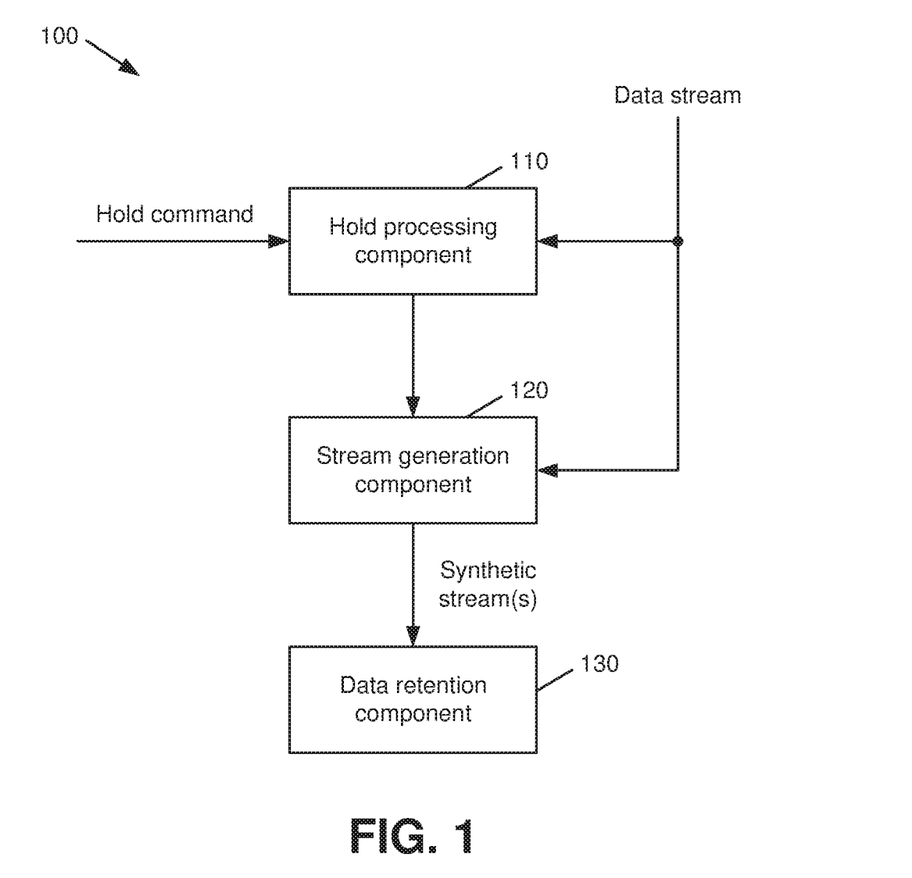
FIG. 1 is a block diagram of a system that facilitates stream retention in a data storage system in accordance with various aspects described herein.

With reference now to the drawings, FIG. 1 illustrates a block diagram of a system 100 that facilitates stream retention in a data storage system in accordance with various aspects described herein. As will be described below, system 100 can operate to hold some or all of a given stream, e.g., for the reasons stated above and/or for other reasons, with minimal impact on the performance of an associated data storage system and/or other computer systems that interact with that data storage system.

As shown in FIG. 1, system 100 includes a hold processing component 110 that can receive a command to implement a hold on at least a portion of a data stream. For clarity, a command of this nature is referred to herein as a "hold command" System 100 as shown in FIG. 1 further includes a stream generation component 120 which, in response to receiving a hold command, can construct a synthetic stream from the portion of the data stream affected by the hold command System 100 additionally includes a data retention component 130 that can prevent alteration of events of the data stream, e.g., the initial data stream for which the hold command was issued, that are included in the synthetic stream generated by the stream generation component 120.

As used herein, "alteration" of a stream is intended to refer both to modification of data associated with an event as well as removal of an event, e.g., by data expiration, expungement, or other means.

By implementing holds on stream data as described herein, various advantages that can improve the function of a computing system can be realized. By way of example, various aspects as described herein can provide a means to hold portions of data associated with a data stream while still allowing events not under hold to be truncated, which can reduce the amount of storage resources associated with maintaining a stream that includes holds on portions of its data, particularly in cases where some or all of the holds are present for long periods of time (e.g., several years). As another example, various aspects described herein can truncate events from a stream while still maintaining the structure of the underlying stream. This can, in turn, enable improved operation of applications that utilize data associated with the stream, since said applications may not be capable of efficiently processing streams with "holes" or missing events. Other advantages are also possible.

Figure 2:
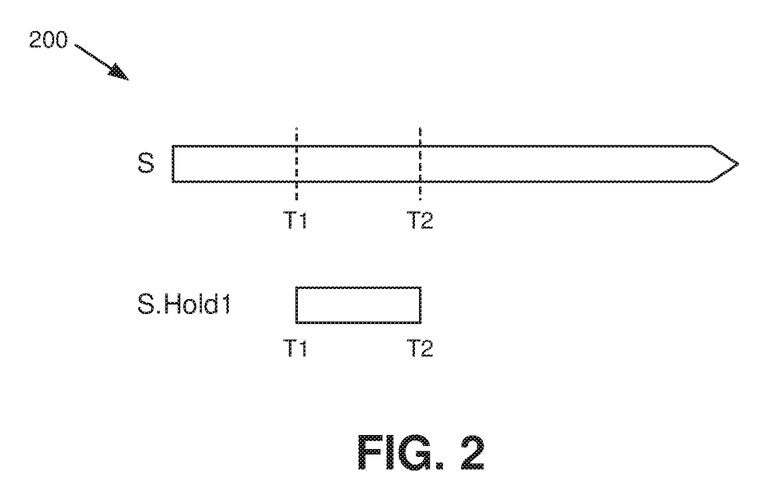
FIG. 2 is a diagram depicting an example synthetic stream structure that can be utilized in accordance with various aspects described herein.

Turning now to FIG. 2, and with further reference to FIG. 1, a diagram 200 of a structure of an example stream S that can be utilized by system 100 is illustrated. As shown by diagram 200, stream S can contain events and/or other data beginning from an origin point or head (shown on the left side of stream S in diagram 200) and proceeding to a tail (shown on the right side of stream S), e.g., which corresponds to a present point in time relative to stream S. In general, a data stream such as stream S can include respective events that are indexed and/or otherwise arranged by time along the timeline provided by the stream.

As further shown by diagram 200, a hold command, e.g., a command similar to the command described above with respect to FIG. 1, can designate a portion of the data stream that is bounded by events and/or other points in time. In the example shown by diagram 200, the hold command designates a portion of the data stream that is bounded by a first point (event) of the data stream associated with a first time T1 and a second point (event) of the data stream associated with a second time T2.

In an aspect, the hold processing component 110 can initially respond to a hold command by assigning a unique name for the hold within the stream for which it is created. By way of non-limiting example as shown in diagram 200, the hold processing component 110 can assign a name, here Hold1, to the hold associated with the received hold command. It should be appreciated that the name Hold1 is provided merely by way of example and that other naming conventions could also be used. Additionally, the hold processing component 110 can further identify the range of events associated with the hold with the pair [first_event_in_range, last_event_in_range], e.g., [T1, T2] as shown in diagram 200.

While diagram 200 illustrates a hold on a data stream that is bounded by a pair of events associated with distinct times T1 and T2, it should be appreciated that a hold can also be implemented on a single event. In the case of a range including a single event, the events in the pair [first_event_in_range, last_event_in_range] to which the portion of the data stream under hold is bounded as described above would be the same event associated with the same time. By way of example, for a hold implemented for an event associated with time T1 and no other events, the portion of the stream under hold would be bounded by [T1, T1] according to the above technique.

Based on the above designations, the stream generation component 120 can create an immutable synthetic stream for the hold shown in diagram 200 at the time the hold is set on stream S. As further shown in diagram 200, the new stream can be assigned an automatically generated name, e.g., StreamName.HoldName, or S.Hold1 in the example shown in diagram 200. In an aspect, the range associated with the hold can define a fixed head and tail for the generated synthetic stream. In another aspect, the synthetic stream as created by the stream generation component 120 can duplicate the structure, e.g., the composition of stream segments, of the parent stream within the range associated with the synthetic stream. Stated another way, the synthetic stream can be generated as a copy of the range of the stream under hold at the time the hold is implemented.

Figure 3:
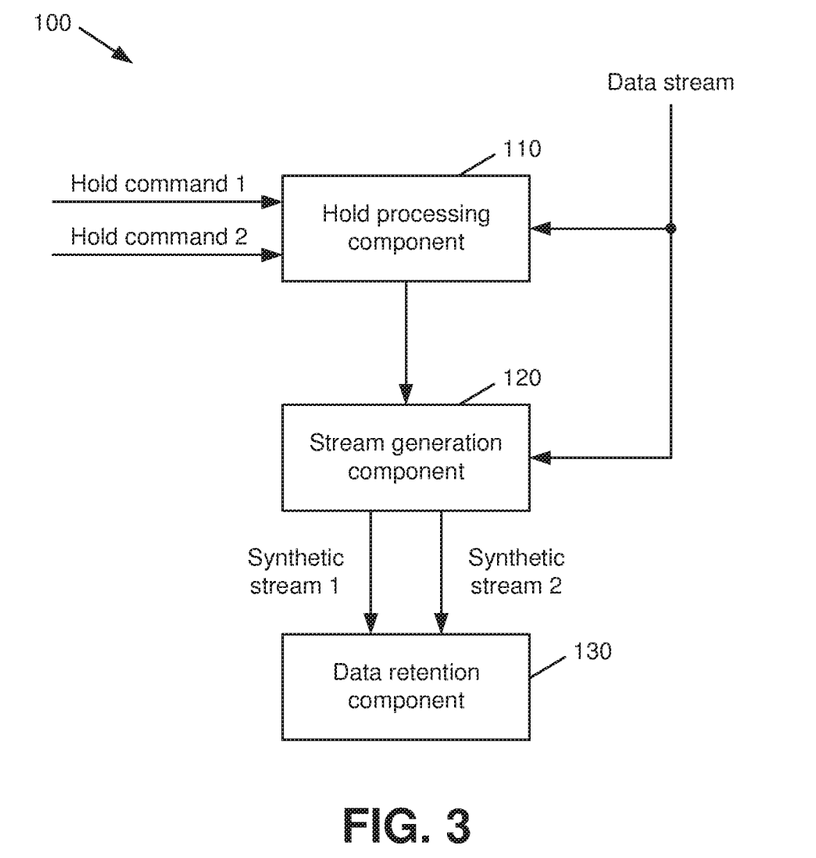
FIG. 3 is a block diagram depicting handling of multiple parallel hold commands by the system of FIG. 1 in accordance with various aspects described herein.

In an aspect, a single stream can have multiple holds set on its data. For instance, FIG. 3 illustrates a scenario in which multiple hold commands are received by the hold processing component 110 of system 100, e.g., at a same time or at different times. Similar to the first hold command as described above with respect to FIGS. 1-2, the hold processing component 110 can receive a second command to implement a second hold on a stream. The second hold can specify a second portion (range) of the data stream that can have an arbitrary positional relationship to the first hold, e.g., such that the ranges subject to the respective holds may at least partially intersect. By way of example, the second hold command can designate a second portion of the data stream that is bounded by a third event associated with a third time and a fourth event associated with a fourth time, which may be the same as or different from the first and second events, respectively, that are associated with the first hold as described above. As a result, the stream generation component 120 can construct a second synthetic stream from the portion of the data stream associated with the second hold in a similar manner to that shown by diagram 200 in FIG. 2.

Figure 4:
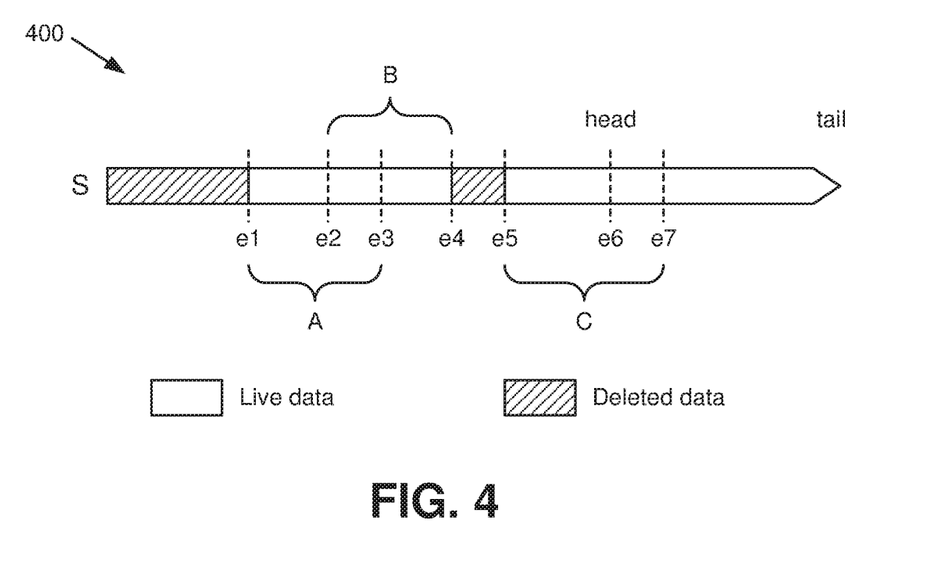
FIG. 4 is a diagram depicting example holds that can be implemented for a data stream in accordance with various aspects described herein.

By way of illustrative example, diagram 400 in FIG. 4 depicts a stream S with three example holds, denoted in diagram 400 as A, B, and C, respectively. As shown by diagram 400, hold A prevents deletion of events in the range from event e1 to event e3, hold B prevents deletion of events in the range from event e2 to e4, and hold C prevents deletion of events in the range from event e5 to event e7. Based on these holds A, B, and C, the stream generation component 120 can create respectively corresponding synthetic streams S.A, S.B, and S.C, as shown by diagram 500 in FIG. 5.

In the example shown by diagram 400, it can be appreciated that the ranges specified by holds A and B intersect, i.e., hold A and hold B both contain the range between event e2 and event e3. In the event of multiple holds with overlapping ranges, the data retention component 130 can prevent deletion or alteration of any events in a region of the data stream associated with multiple holds until all of the associated holds are reset. Thus, in the example shown by diagram 400, the range between event e2 and event e3 can be protected against deletion or alteration until both holds A and B are reset.

Figure 5:
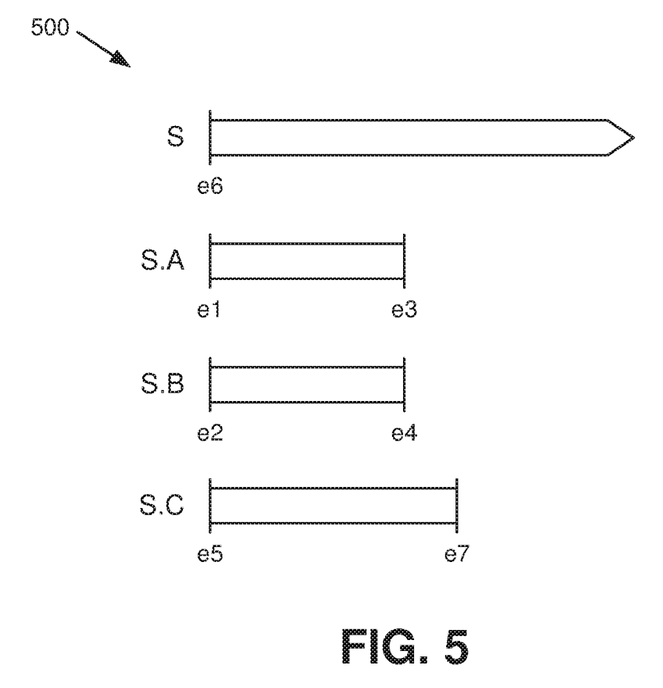
FIG. 5 is a diagram depicting respective synthetic streams that can be generated for the data stream of FIG. 4 in accordance with various aspects described herein.

As further shown by diagram 400, data expiration can be configured for stream S such that any events prior to an event e6 are configured to be deleted from the stream. The resulting stream S after this data expiration is shown in diagram 500 along with the synthetic streams S.A, S.B, and S.C. It should be appreciated, however, that despite the events that are the subject of holds A, B, and/or C being removed from the main stream S, said events are still preserved within their respective synthetic streams. As stated above, an event can be protected from deletion or alteration by the data retention component 130 until all holds and/or corresponding synthetic streams to which the event belongs are removed.

In contrast to the above, the visibility of events in stream S can be configured such that an application and/or other component that works with stream S can see stream S in the form shown by diagram 500, e.g., the application will be able to access no event older than e6 from stream S. In this case, an application can still view and access older events under hold in their respective synthetic streams if desired.

By preserving events that are the subject of respective holds in their own synthetic streams, events can be expired, truncated, and/or otherwise removed from stream S without altering any events that are subject to one or more holds. Because the techniques described herein do not ban data expiration or stream truncation, the capacity footprint of streams can be kept to desirable levels while still enabling holds to be implemented. In addition, separating held events into synthetic streams can enable stream S to be maintained as a continuous and consistent chain without missing events or "holes" that could be difficult for applications to process using existing methods.

In an aspect, from the perspective of an application accessing respective streams as shown by diagram 500, the behavior of stream S does not change, with the exception that any stream, including stream S, can be prevented from being deleted while there are holds set on its data. In the absence of holds, data expiration can still operate on the stream, and the application can still truncate the stream as desired. Visibility of the stream data can change as a result of expiration and/or truncation accordingly. In another aspect, the stream storage system can be configured to preserve events (segments, data chunks, etc.) that have at least one stream, either normal or synthetic, that contain them.

As shown in diagrams 400 and 500, it can be appreciated that the range of stream S subsequent to data expiration intersects with the range of synthetic stream S.C. Nevertheless, events in the range from events e5 to e6 would be visible to readers of synthetic stream S.C only as noted above. In a further aspect, synthetic streams S.A, S.B, and S.C can be made immutable such that they cannot be further modified once created, unlike main stream S.

Figure 6:
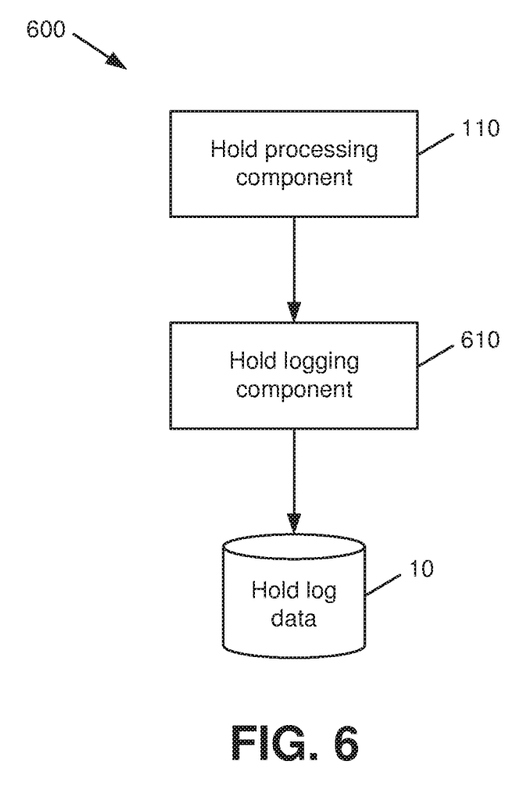
FIG. 6 is a block diagram of a system that facilitates generating and maintaining log information relating to holds implemented on a data stream in accordance with various aspects described herein.

With reference now to FIG. 6, a block diagram of a system 600 that facilitates generating and maintaining log information relating to holds implemented on a data stream in accordance with various aspects described herein is illustrated. Repetitive description of like elements employed in other embodiments described herein is omitted for brevity. As shown by FIG. 6, system 600 includes a hold processing component 110 that can receive hold commands and process resulting data holds, e.g., as described above with respect to FIG. 1. As further shown in FIG. 6, system 600 can also include a hold logging component 610 that can maintain a set of hold log data 10 and/or other information relating to respective holds that are implemented on a data stream by the hold processing component 110. In an aspect, hold log data 10 maintained by the hold logging component 610 can include information such as names of holds and/or their corresponding synthetic streams, data ranges associated with the hold(s), times at which respective holds are implemented, the nature of the respective holds (e.g., whether the holds are legal holds or other types of holds), and/or any other suitable information.

Figure 7:
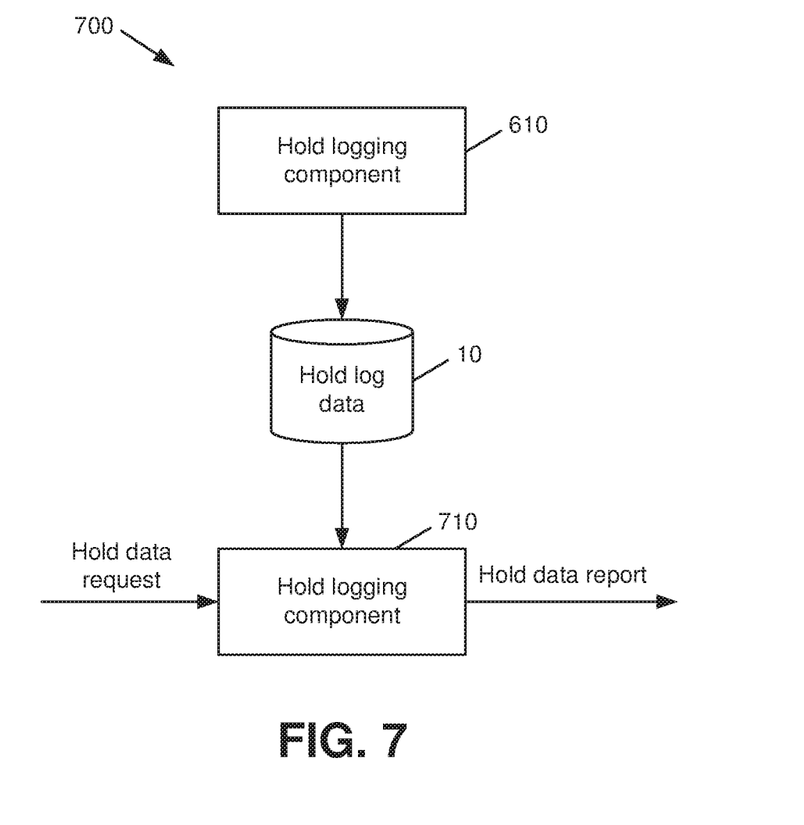
FIG. 7 is a block diagram of a system that facilitates generating and reporting hold log information for a data stream in accordance with various aspects described herein.

In a further aspect as shown by system 700 in FIG. 7, hold log data 10 maintained by the hold logging component can be provided to a requesting system or entity by a hold logging component 710 in response to receiving a request from said system or entity. In one example, a stream API associated with an underlying stream storage system associated with system 700 can be expanded such that an application or other requesting system can request a list of holds that are associated with a given normal (non-synthetic) stream. In response to such a request, the hold logging component 710 can leverage a naming convention such as the one described above with respect to FIG. 2 and/or FIG. 5 to compile names or other identifiers for respective synthetic streams that have been created for an underlying main stream.

Figure 8:
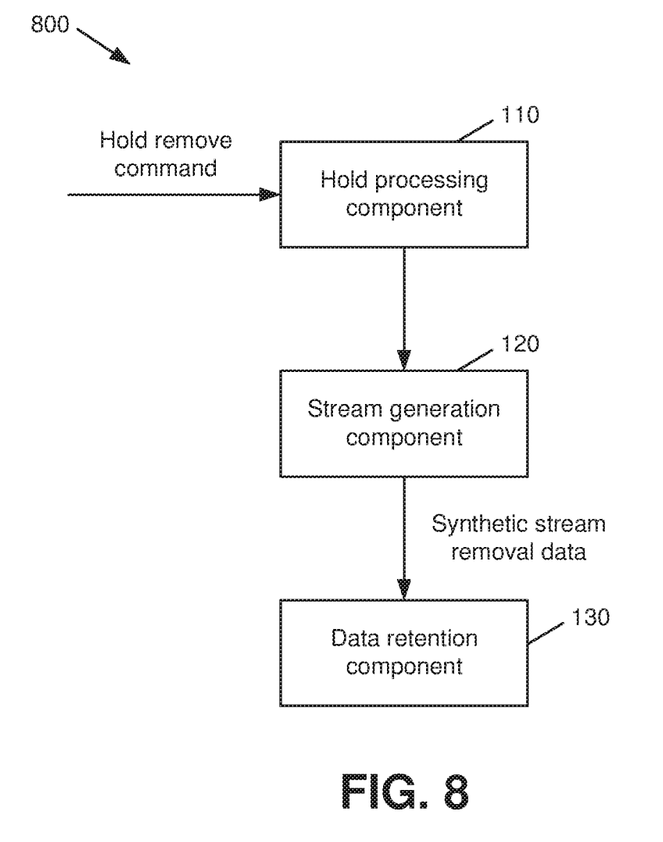
FIG. 8 is a block diagram of a system that facilitates removing a hold implemented on a data stream in accordance with various aspects described herein.

Turning next to FIG. 8, a block diagram of a system 800 that facilitates removing a hold implemented on a data stream in accordance with various aspects described herein is illustrated. Repetitive description of like elements employed in other embodiments described herein is omitted for brevity. As shown in FIG. 8, system 800 includes a hold processing component 110 and a stream generation component 120 that can generate a synthetic stream in response to receiving a hold command as described above. In an aspect, in response to the hold processing component 110 receiving a subsequent command to remove a hold on a given portion of stream data, the stream generation component 120 can be configured to remove the synthetic stream corresponding to that hold. Once the synthetic stream has been removed, the data retention component 130 can be configured to enable modification of the data associated with the newly released hold.

In general, it can be appreciated that synthetic streams can be generated with limited functionality. For instance, a synthetic stream can be created or deleted when a hold is set or removed, respectively, as described above. Further, a synthetic stream can be read using standard APIs of the stream storage system. In another aspect, in order to simplify operation of the underlying stream storage system, recursive holds within a stream, e.g., holds set on a synthetic stream, can be prevented. Instead, holds that are to be implemented on a portion of data already associated with a synthetic stream can instead be associated with a new synthetic stream created from the main parent stream.

Figure 9:
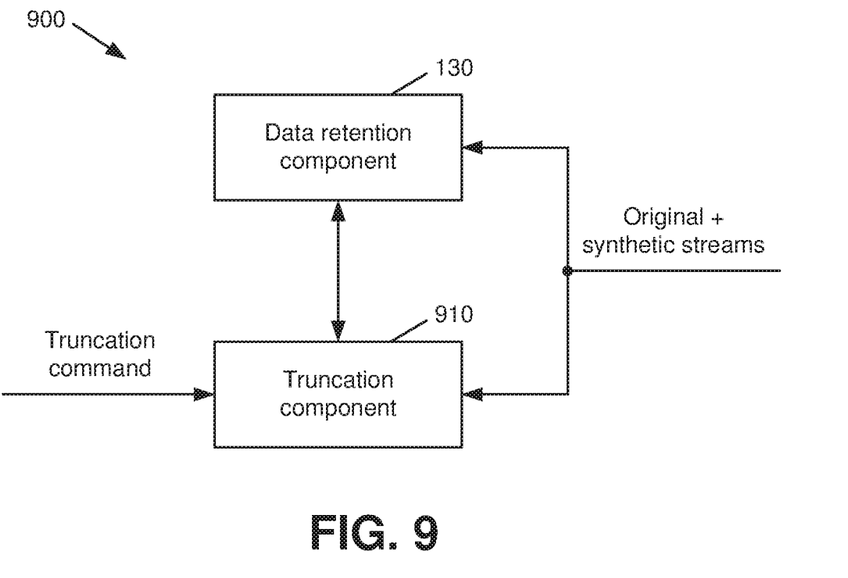
FIG. 9 is a block diagram of a system that facilitates truncation of data associated with a data stream in accordance with various aspects described herein.

With reference now to FIG. 9, a block diagram of a system 900 that facilitates truncation of data associated with a data stream in accordance with various aspects described herein is illustrated. Repetitive description of like elements employed in other embodiments described herein is omitted for brevity. As shown in FIG. 9, system 900 includes a truncation component 910 that can remove data from one or more data streams, e.g., via data expiration, explicit truncation commands, and/or by other means. In an aspect, in response to a truncation of a data stream being initiated, the truncation component 910 can cause events that are subject to one or more holds, and, by extension, events associated with one or more synthetic streams, to be hidden from the main data stream while preserving those events in their corresponding synthetic streams. An example of this is described above with respect to stream S in FIG. 5, where parent stream S is truncated from event e6 while preserving events that are subject to hold in respective synthetic streams S.A, S.B, and S.C.

Figure 10:
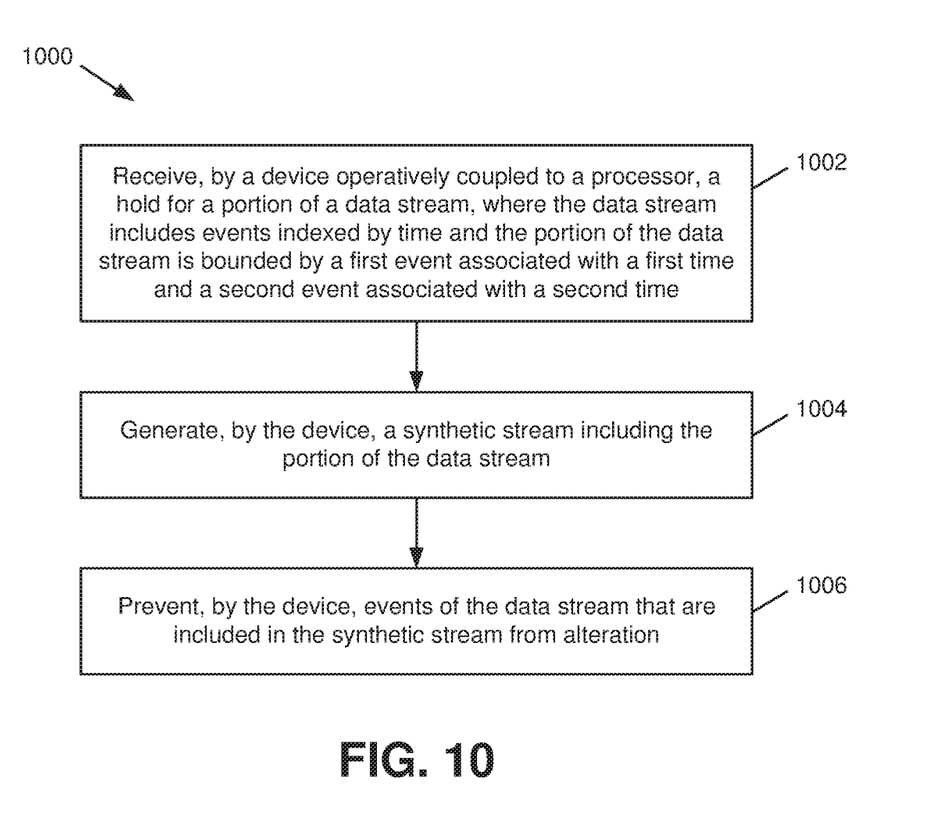
FIG. 10 is a flow diagram of a method that facilitates stream retention in a data storage system in accordance with various aspects described herein.

Referring next to FIG. 10, a flow diagram of a method 1000 that facilitates stream retention in a data storage system in accordance with various aspects described herein is illustrated. At 1002, a device operatively coupled to a processor can receive (e.g., by a hold processing component 110) a hold for a portion of a data stream. Here, the data stream includes events indexed by time, and the portion of the data stream associated with the hold is bounded by a first event associated with a first time and a second event associated with a second time. In an aspect, the first event and the second event can be different events associated with different times or a same event associated with a same time. For instance, in the case of a hold on a single event, the first event and the second event, as well as the first time and the second time, can be the same event and time, respectively.

At 1004, the device can generate (e.g., by a stream generation component 120) a synthetic stream that includes the portion of the data stream associated with the hold received at 1002.

At 1006, the device can prevent (e.g., by a data retention component 130) events of the data stream that are included in the synthetic stream generated at 1004 from alteration, e.g., modification, removal (via data expiration, truncation, or other means), and/or any other operations that would change data associated with the events of the synthetic stream.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
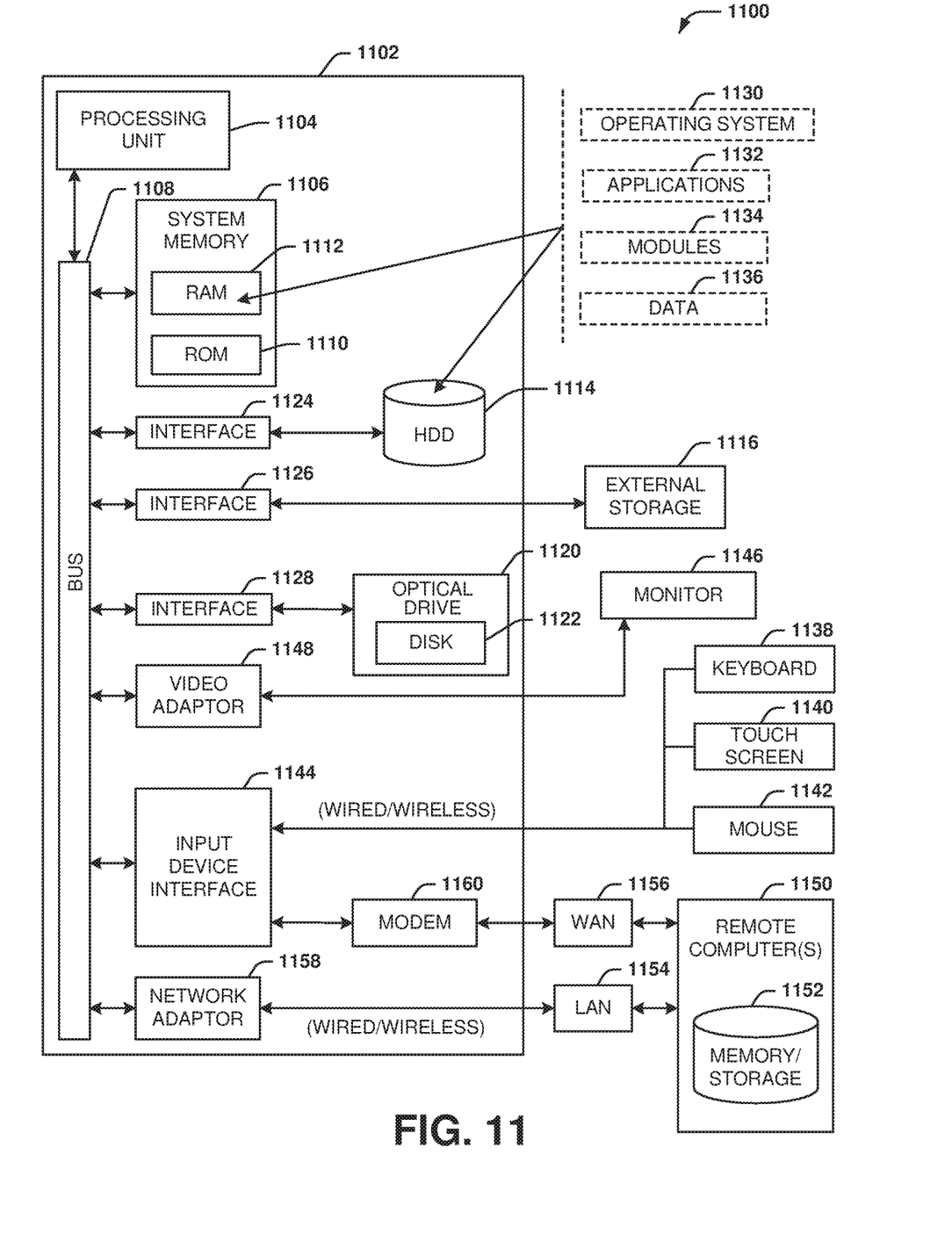
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
      a hold processing component that receives a command to implement a hold on a portion of a data stream, wherein the data stream comprises respective events indexed by time, and wherein the portion of the data stream is bounded by a first event of the data stream that is associated with a first time and a second event of the data stream that is associated with a second time;
      a stream generation component that constructs a synthetic stream from the portion of the data stream;
      a data retention component that prevents alteration of events of the data stream that are included in the synthetic stream; and
      a truncation component that, in response to a truncation of the data stream being initiated, causes an event, of the respective events that are associated with the hold, to be hidden from the data stream, wherein the truncation component preserves the event in the synthetic stream.

2. The data storage system of claim 1, wherein the command is a first command to implement a first hold on a first portion of the data stream, and wherein the hold processing component receives a second command to implement a second hold on a second portion of the data stream bounded by a third event of the data stream that is associated with a third time and a fourth event of the data stream that is associated with a fourth time.

3. The data storage system of claim 2, wherein the synthetic stream is a first synthetic stream, and wherein the stream generation component constructs a second synthetic stream from the second portion of the data stream.

4. The data storage system of claim 3, wherein the data retention component prevents alteration of an event of the data stream that is included in the first synthetic stream and the second synthetic stream pending removal of the first synthetic stream and the second synthetic stream.

5. The data storage system of claim 1, wherein the hold is a first hold, and wherein the computer executable components further comprise:
   a hold logging component that maintains information relating to respective holds implemented on the data stream, the respective holds comprising the first hold.

6. The data storage system of claim 5, wherein the computer executable components further comprise:
   a hold reporting component that provides the information relating to the respective holds to a requesting system in response to receiving a request from the requesting system.

7. The data storage system of claim 1, wherein the command is a first command, wherein the hold processing component receives a second command to remove the hold on the portion of the data stream, and wherein the stream generation component removes the synthetic stream in response to the hold on the portion of the data stream being removed.

8. A method, comprising:
   receiving, by a device operatively coupled to a processor, a hold for a portion of a data stream, wherein the data stream comprises respective events indexed by time, and wherein the portion of the data stream is bounded by a first event of the data stream that is associated with a first time and a second event of the data stream that is associated with a second time;
   generating, by the device, a synthetic stream comprising the portion of the data stream;
   preventing, by the device, events of the data stream that are included in the synthetic stream from alteration; and
   preserving, by the device in response to a truncation of the data stream being initiated, an event, of the respective events that are associated with the hold, in the synthetic stream while removing the event from the data stream.

9. The method of claim 8, wherein the command is a first command, and wherein the method further comprises:
   receiving, by the device, a second command to remove the hold; and
   removing the synthetic stream in response to the hold being removed.

10. The method of claim 8, wherein the hold is a first hold for a first portion of the data stream, and wherein the method further comprises:
   receiving, by the device, a second hold for a second portion of the data stream, wherein the second portion of the data stream is bounded by a third event of the data stream that is associated with a third time and a fourth event of the data stream that is associated with a fourth time.

11. The method of claim 10, wherein the synthetic stream is a first synthetic stream, and wherein the method further comprises:

constructing, by the device, a second synthetic stream from the second portion of the data stream.

12. The method of claim 11, further comprising:

preventing, by the device, alteration of an event of the data stream that is included in the first synthetic stream and the second synthetic stream pending removal of the first synthetic stream and the second synthetic stream.

13. The method of claim 8, wherein the hold is a first hold, and wherein the method further comprises:

recording, by the device, information relating to respective holds implemented on the data stream, wherein the respective holds comprise the first hold.

14. The method of claim 13, further comprising:

providing, by the device in response to receiving a request from a requesting system, the information relating to the respective holds to the requesting system.

15. A non-transitory machine-readable storage medium comprising computer executable instructions that, when executed by a processor of a data storage system, facilitate performance of operations, the operations comprising:

initiating a hold for a portion of a data stream, wherein the data stream comprises respective events indexed by time, and wherein the portion of the data stream is bounded by a first event of the data stream that is associated with a first time and a second event of the data stream that is associated with a second time;

adding the portion of the data stream to a synthetic data stream;

preventing alteration of events of the data stream that are included in the synthetic data stream; and in response to a pruning operation for the data stream being initiated, removing an event, of the respective events that are associated with the hold, from view within the data stream while preserving the event in the synthetic data stream.

16. The non-transitory machine-readable storage medium of claim 15, wherein the operations further comprise:

discarding the synthetic data stream in response to the hold being removed.

17. The non-transitory machine-readable storage medium of claim 15, wherein the hold is a first hold for a first portion of the data stream, wherein the synthetic data stream is a first synthetic data stream, and wherein the operations further comprise:

initiating a second hold for a second portion of the data stream, wherein the second portion of the data stream is bounded by a third event of the data stream that is associated with a third time and a fourth event of the data stream that is associated with a fourth time; and adding the second portion of the data stream to a second synthetic data stream.

18. The non-transitory machine-readable storage medium of claim 17, wherein the operations further comprise:

preventing alteration of events of the data stream that are included in the first synthetic data stream and the second synthetic data stream pending the first synthetic data stream and the second synthetic data stream being discarded.

19. The non-transitory machine-readable medium of claim 15, wherein the hold is a first hold, and wherein the operations further comprise:

recording information relating to respective holds implemented on the data stream, the respective holds comprising the first hold.

20. The non-transitory machine-readable medium of claim 19, wherein the operations further comprise:

in response to receiving a request from a requesting system, transferring information relating to the respective holds to the requesting system.

* * * * *